March 27, 1934.

C. H. LOTTE 1,952,267

CLUTCH OPERATING MECHANISM FOR TRACTORS

Filed Aug. 9, 1930     5 Sheets-Sheet 1

INVENTOR.
Charles H. Lotte
BY
Ray Oberlin & Fay
ATTORNEYS.

March 27, 1934. C. H. LOTTE 1,952,267
CLUTCH OPERATING MECHANISM FOR TRACTORS
Filed Aug. 9, 1930 5 Sheets-Sheet 3

INVENTOR.
Charles H. Lotte
BY
Fay Oberlin & Fay
ATTORNEYS.

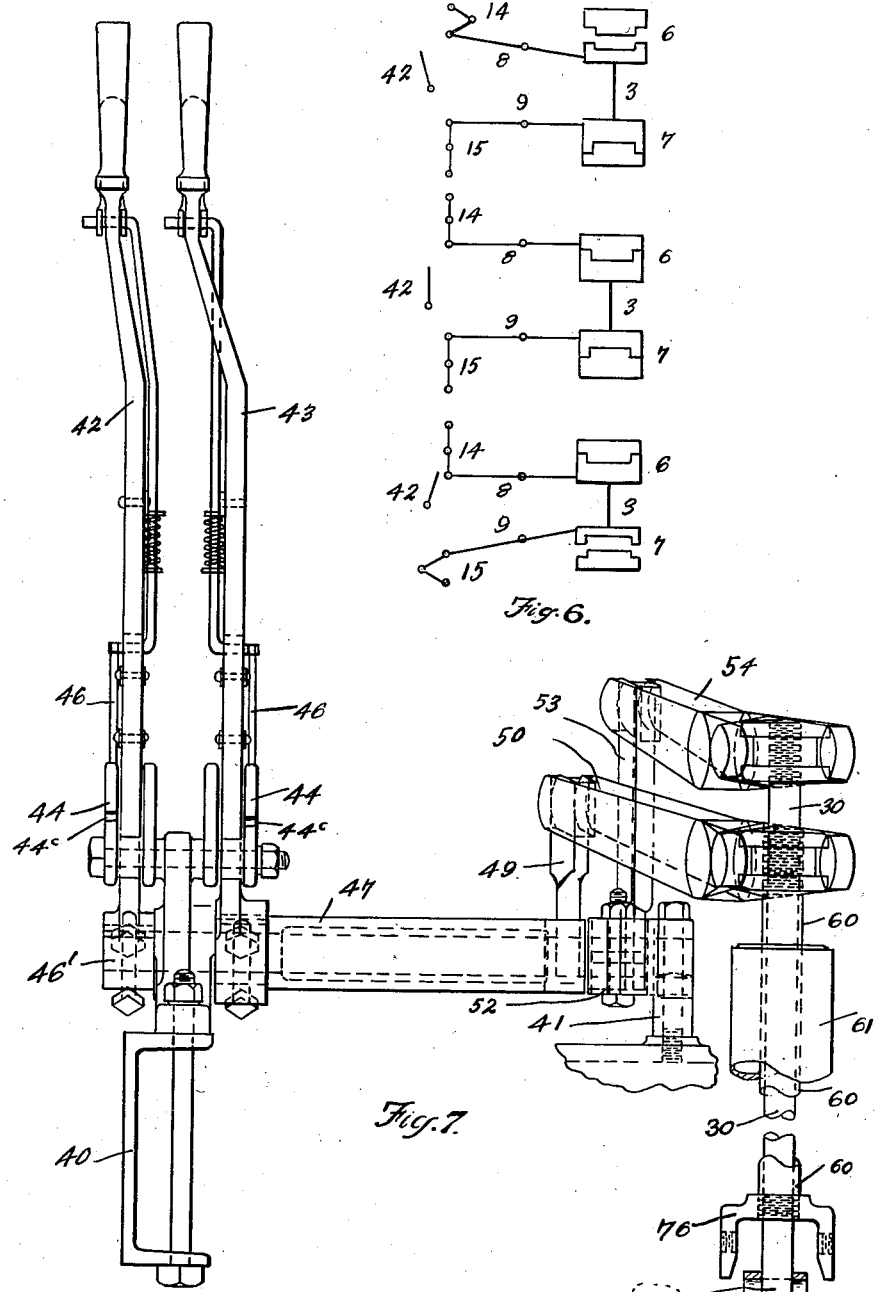

March 27, 1934.  C. H. LOTTE  1,952,267
CLUTCH OPERATING MECHANISM FOR TRACTORS
Filed Aug. 9, 1930  5 Sheets-Sheet 5
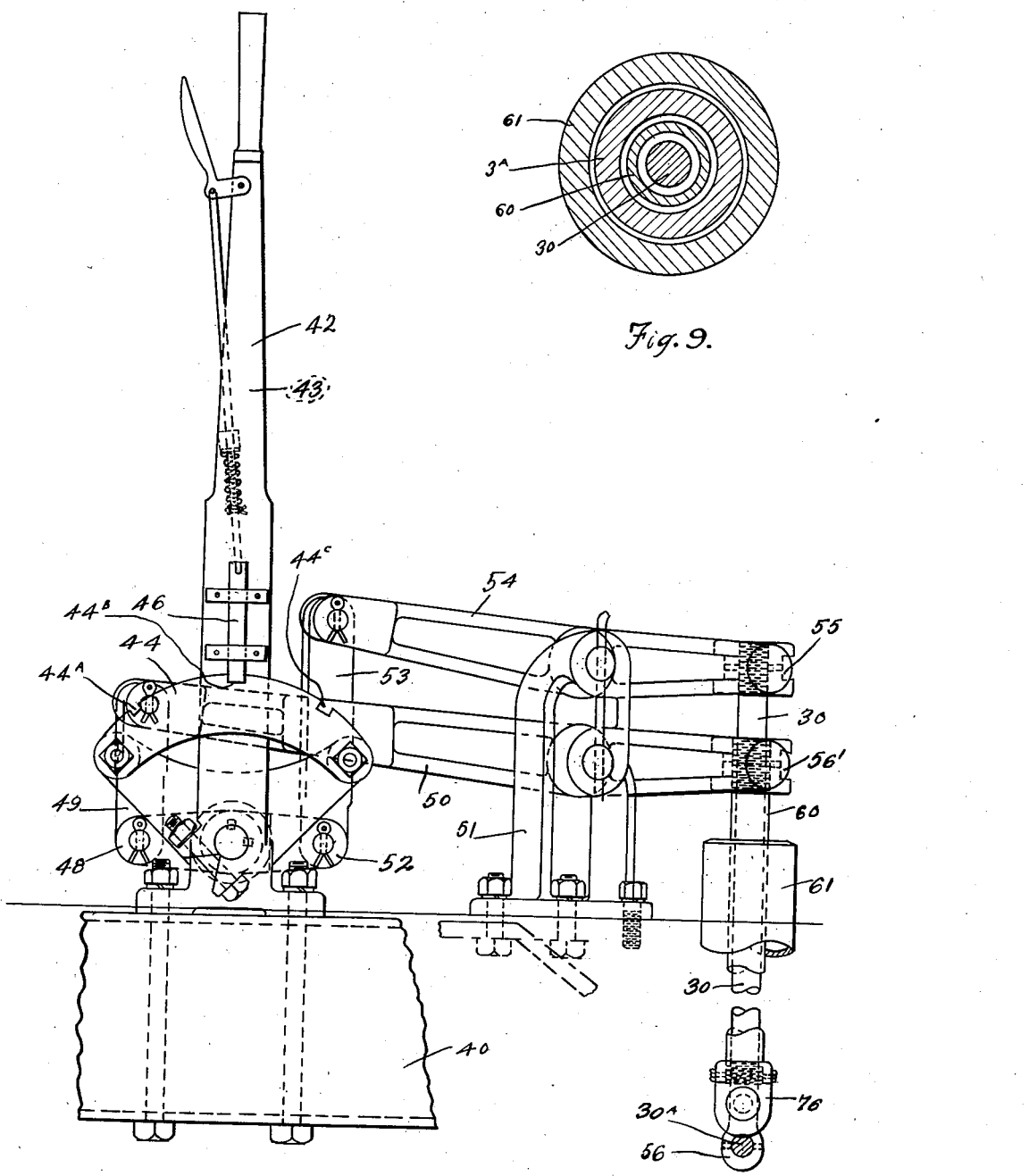
INVENTOR.
Charles H. Lotte
BY
Fay Oberlin & Fay
ATTORNEY.S.

Patented Mar. 27, 1934

1,952,267

UNITED STATES PATENT OFFICE 1,952,267

CLUTCH OPERATING MECHANISM FOR TRACTORS

Charles H. Lotte, Ravenna, Ohio, assignor to The Byers Machine Company, Ravenna, Ohio, a corporation of Ohio Application August 9, 1930, Serial No. 474,261

5 Claims. (Cl. 192—99)

This invention relates to clutch operating mechanism particularly adapted for use with tractors of the type having a continuous tread on either side of a chassis, and is particularly intended for use with tractors which constitute the transporting means for power shovels, cranes and similar material handling machinery. While not strictly limited in its uses, certain features of the invention are especially directed to machines of the character mentioned which have a super-structure revoluble with respect to the transporting means, as is particularly the case in power shovel practice.

Among the purposes of my invention are the provision of means whereby the clutch mechanism can be so operated that the tractor element can be either driven straight ahead or turned in either direction on either a long or short radius, or whereby both treads may be allowed to run free for towing purposes. Other purposes are the provision of control means which will be simple, comprising only a few positions of the clutch operating lever, which will always occupy the same situation relative to the operator irrespective of the angular relation of the superstructure to the transporting means. Still another aim is the provision of substantially automatic means for locking the driving clutches into position and for providing a mechanical advantage for the disengagement of these clutches. Still further aims of the invention are the provision of improved co-ordinated control and of arrangements for varying the action of certain elements to meet unusual operating conditions not provided for by the principal controls.

The annexed drawings and the following description set forth in detail certain mechanism embodying the invention, such disclosed means constituting, however, but one of various mechanical forms in which the principles of the invention may be used.

Figure 1:
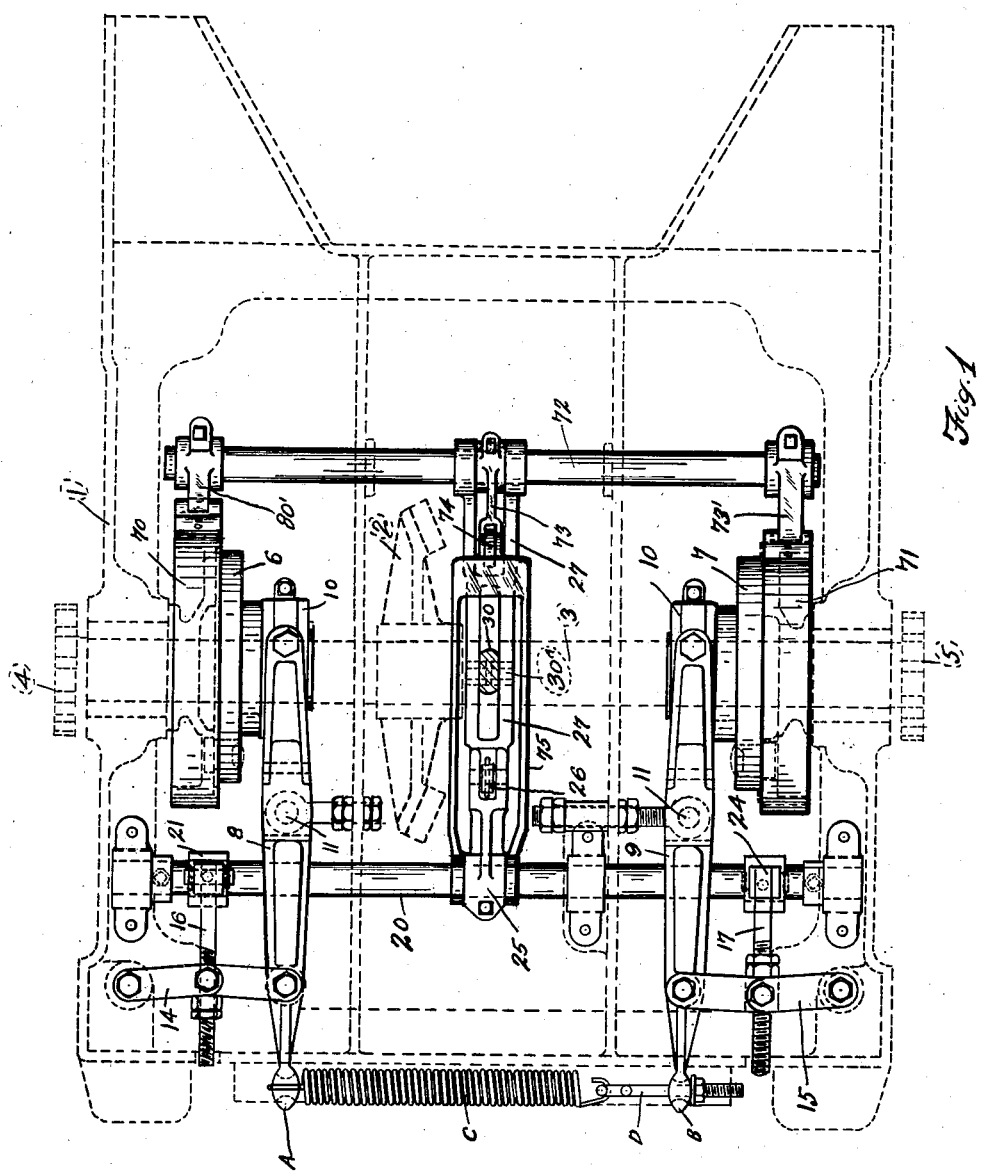
Figure 2:
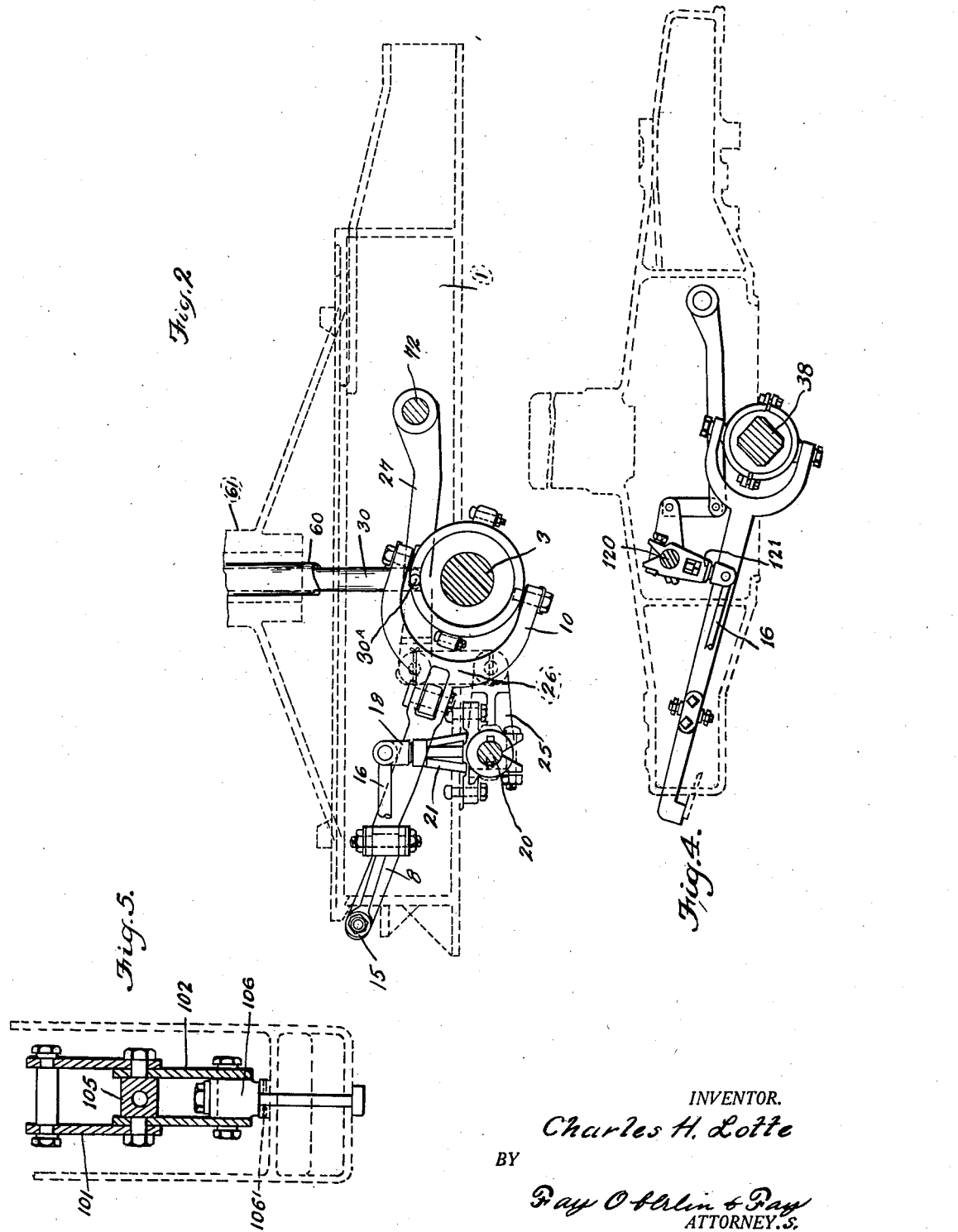
Figure 3:
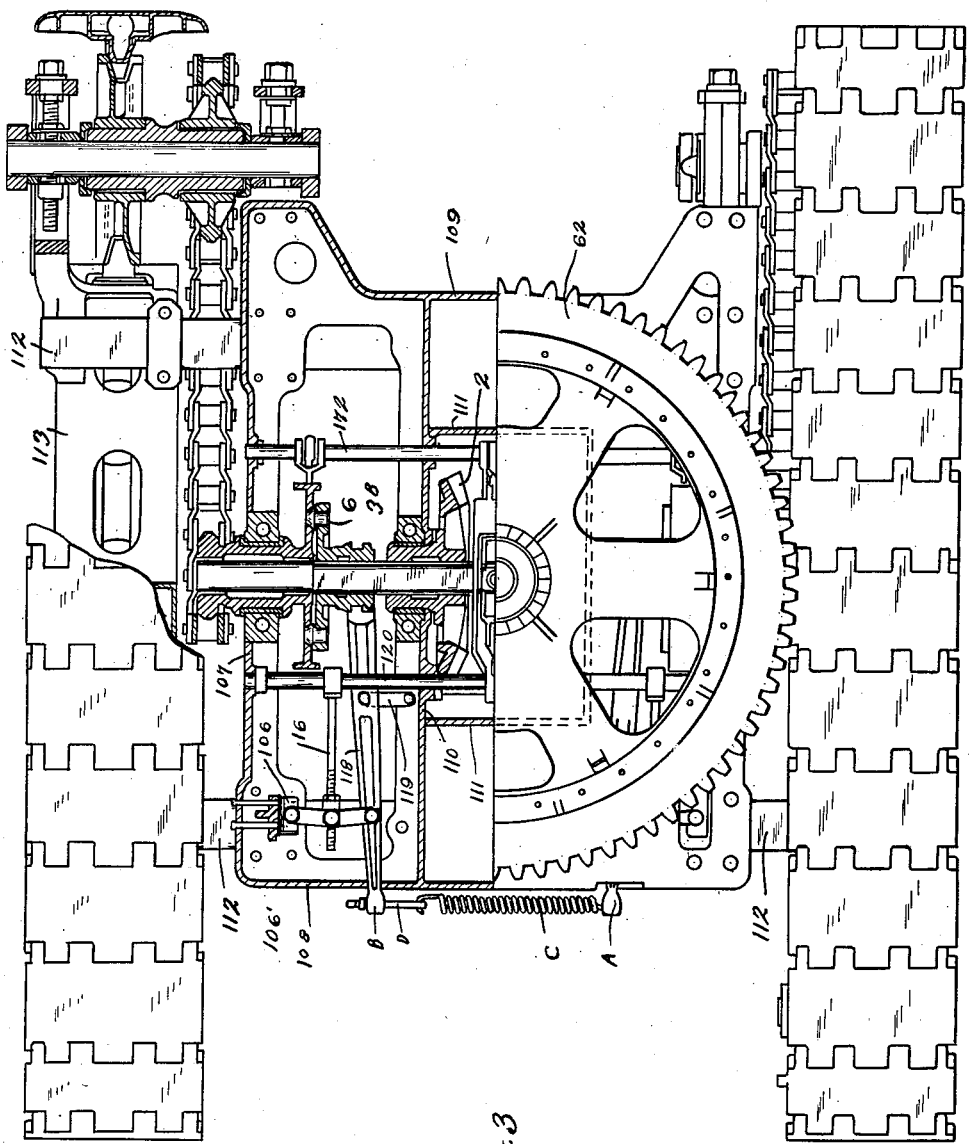

In said annexed drawings:

Fig. 1 is a plan view looking up from below, showing the clutch operating mechanism as applied to a tractor; Fig. 2 is a detail in side elevation and partly in section, of one form of the lower portion of the clutch operating mechanism of Fig. 1; Fig. 3 is a plan view, partly in section, looking down on a heavier type of mechanism than that shown in Fig. 1; Fig. 4 is a view of certain lever connections similar to those shown in Fig. 2, but particularly adapted for the structure of Fig. 3; Fig. 5 is a toggle link detail; Fig. 6 is a series of related diagrammatic views of various positions of the clutches and clutch control levers; Fig. 7 is a rear view, and Fig. 8 is a side view of the lever trains and connections; Fig. 9 is a diagrammatic plan view of the various elements passing through the central pivot.

Referring particularly to Fig. 1, my improved clutch and its operating apparatus is shown in a typical situation for which it is particularly adapted as mounted on the truck frame or chassis, shown in dotted lines, and generally indicated by the reference character 1. This chassis is of standard construction intended for use with suitable traction means on each side, preferably of the caterpillar or crawler type, which are not shown, but similar to those shown in Fig. 3, and to which power is transmitted from a suitable prime mover by the gear 2 and main drive shaft 3, all in a manner which will be readily understood to those skilled in the art, and which does not in itself constitute a part of this invention.

The superstructure or cab platform, sometimes called the machinery deck, is pivoted upon a hollow king pin 61, Figs. 2 and 4, and is turned by a depending pinion (not shown) engaging a large ring gear 62, fixed to the frame. The superstructure carries the motive power, and the operator's levers, all in the manner usual in this art.

A hollow power shaft 3A, Figs. 4 and 13, passing down concentrically through the king pin or center journal 61, carries a horizontal bevel gear 2A at the bottom, meshing with the gear 2, Fig. 3. Within the power shaft, but independent of it, are concentric reciprocable plungers, 60 and 30, which connect the operator's levers with the brakes and clutches, respectively, the outer plunger 60 being tubular.

The drive of each crawler tread is, insofar as this description is concerned, by means of sprockets 4 and 5 which are independently engageable with the drive shaft 3 by means of separate clutches 6 and 7 on opposite sides of the machine. These clutches which are of the positive type, are actuated by levers 8 and 9 forked to engage with the usual yokes 10, and are pivoted in the middle as at 11 to fixed parts of the frame. For convenience, the fork end of the levers will be termed the rear, in accordance with the usual direction of travel of the machine. The levers 8 and 9 extend forwardly a little in advance of the front of the frame for a purpose to be described below. Somewhat short of the front ends of the levers, the inner links of toggles 14 and 15 are pivoted thereto, the toggles serving to lock the clutch levers so that the clutch teeth cannot jump out.

For the toggle details, reference is made partly to Fig. 5, which illustrates the form shown in Fig. 3, but differs from that in Fig. 1 only in the method of attachment to the frame. The toggles 14 and 15 extend outwardly and each has the outer end of its outer link pivoted directly to the frame in Fig. 1, or to an adjustably mounted bracket 106 in Fig. 3. The center of each toggle is movable by means of a rod such as 16 or 17, the travel of which in one direction is adjustable by means of nuts, as shown in Figs. 1 and 3. As best seen in Fig. 5, each toggle is conveniently made with double links, the inner of which, 101, are pivoted to the top and bottom of the clutch lever, while the outer, 102, are pivoted to a rigid support. A longitudinally-apertured block 105 carries the central pivots. The aperture through the block is smooth and large enough to permit the toggle rod to slide freely.

Referring back to Fig. 1, it is apparent that rearward motion of the rod 16 breaks the toggle 14, moving the lever 8 on the pin 11 to disengage the clutch 6, while forward movement of the rod 17 breaks the toggle 15 and throws out the clutch 7. Each rod 16 and 17 is preferably an eyebolt, having the eye pinned to a swivel 18 carried by a standard 21 which is fast to a transverse shaft 20 supported by bearings on the sides of the frame. Thus the support of the rod 16 is sufficiently flexible to permit necessary vertical and horizontal angular movement of the rod 16. A similar mounting 24 carries the rod 17. Therefore, clockwise turning of the shaft 20 breaks the toggle 14, but does not affect toggle 15, because the rod 17 slides idly through its block 105. In similar manner counterclockwise movement breaks the toggle 15, while the rod 16 slides forward idly. This independent breaking of each toggle allows either clutch to be disengaged, leaving the other engaged.

The extreme rear ends of the levers 8 and 9 are extended somewhat in advance of the front edge of the frame 1, and considerably in advance of the points of attachment of the toggles 14 and 15, terminating at these ends in eyes A and B. A coiled spring C is adjustably fastened between the eyes A and B, giving a constant inward tension on the front ends of the levers 8 and 9 and so constantly urging each of the clutches into engaged position. Due to the one-way action of the toggles, the normal engaged position of the clutches is automatically attained or resumed except when one toggle or the other is broken.

It will be remembered that the clutches 6 and 7 are of the positive type, and it may therefore happen that the teeth and corresponding depressions are not in registry when the operator wishes to throw in either or both clutches. In this event, spring action holds the inner ends of the teeth against flat parts of the opposing clutch member, as will be readily understood, so that when the shaft 3 turns the teeth snap into their recesses as soon as the parts register. Thus engaging the clutches puts no strain on the operator.

On account of the heavy work to which this apparatus is put, the clutches may tend to stick and be difficult to disengage. This is overcome by the mechanical advantage incident to the operation of a toggle, whereby a powerful inward pull can be exerted on either clutch lever without undue exertion by the operator.

The connections whereby the operator moves the shaft 20 are shown in Figs. 1, 2, 4, 7, 8 and 9. The shaft 20 is actuated from the control station by means of a forwardly extending arm 25 connected by an upward link 26 to a longer horizontal arm 27, above the drive shaft 3 and freely supported at its rear end on a cross shaft 72.

About the middle of the arm 27 a vertical rod 30 is connected thereto as by a pin 30A working in a slot to allow the necessary play, since the rod 30 is capable of vertical movement only. This rod 30 constitutes the connecting link between the lever train in the frame and the lever train in the superstructure.

The lever system in the superstructure is seen in Figs. 7 and 8. This lever system may be secured to the cab platform as at 41 and to the platform framing 40. It comprises a clutch-operating lever 42 and a brake-operating lever 43, each working on a notched rack 44, 45, and each having a positive dog attachment 46 with the selective engagement by a dog 46 with any one of three notches 44A, 44B, 44C, or similar notches, in its respective rack. The lever 42 rocks a shaft 46' and the lever 43 rocks a sleeve 47 concentric therewith, both of these members 46' and 47 being for the purpose of locating the levers 42 and 43 in a position more convenient for the operator than could otherwise be done. The motion of the shaft 46' is taken off by an arm 52 and link 53, thereby actuating a lever 54 which is fulcrumed to a support 51 (omitted from Fig. 7 for clearness) and has a swivel connection 55 to the upper end of the plunger 30. The bottom of the plunger 30 terminates in an eye 56 which carries the pin connection 30A with the lever 27, in a manner to be described below. The sleeve 47 is similarly connected to the hollow plunger 60 by an arm 48, link 49, lever 50, and swivel joint 56'. A fork 76 at the bottom of the plunger 60 is connected to the brake operating system which will now be described.

A brake mechanism which is particularly adapted for coaction with the clutch control of the present invention is illustrated to some extent in the figures for the purpose of showing the cooperative relationship. The brakes illustratively included in the present disclosure are of the band type and are designated by reference numerals 70 and 71. These brakes engage brake drums which are concentric with the outer element of each of the clutches 6 and 7. These bands are actuated by a transverse rock shaft 72 held in the frame by suitable bearings and connected at its ends to each brake mechanism. The shaft 72 is connected to the tubular plunger 60, and thereby to the lever 43 in the operator's cab, by means of a short horizontal arm 73 fast to 72, the arm 73 having a vertical link connection 74 to a horizontal lever 75, the lower end of the sleeve 6 being connected to the middle of the lever by the fork 76. This lever 75 is freely fulcrumed on shaft 20 by an eye 77 hinged on the shaft 20. The brake mechanism which is not illustrated in detail because not included in the claims annexed hereto is such that both brakes are off when the hand lever 43 is vertical and the lever 75 is in the position shown in Figs. 14 and 15, moving the lever 43 to the left (Fig. 8) sets the right brake, while the right hand position of the lever 43 (with the dog 46 in the notch 44c) sets the left brake. It is not intended to set both brakes at once.

Certain modifications of details appropriate to a frame construction for large sized machines are illustrated in Figs. 3 and 4 wherein the frame is shown as a unitary casting which includes parallel longitudinal side webs 107, transverse end webs 108, 109, and inner longitudinal and transverse webs 110 and 111.

Some differences in details of the clutch actuating mechanism have been found advantageous in the heavier form, Fig. 3. The toggles are attached to the frame by a movable bracket 106 adjustable by shims 106' instead of directly, as is the case in Fig. 1. The clutch levers, such as 118, are connected to the frame by a link 119, instead of by a rigid rod. The toggle rod swivels, as 121, are beneath the clutch shaft 120, instead of above.

The operation of the apparatus will now be briefly reviewed. Particular reference is made to Fig. 6, each which is divided into three sections and is a diagrammatic view of the essential parts of the clutch system the reference characters used being the same as in Figs. 1, 7 and 8.

Fig. 6, top, shows the clutch lever 42 in the notch 44A of Fig. 8, toggle 14 broken, clutch 6 out, hence no power from the drive shaft 3 to the right crawler. Power is on the left crawler. If the brakes are both off the right crawler will idle, and the tractor will go to the right in a large circle, but if the right brake is on the right crawler will be held, and the tractor will turn in a small circle.

Fig. 6, middle, shows the clutch lever 42 in notch 44B of Fig. 8, both toggles straight, both clutches engaged and the tractor going straight ahead with power on both crawlers.

Fig. 6, bottom, is the reverse setting of Fig. 6, top, and the tractor is turning to the left, on a large circle if the brakes are off but on a short radius if the brake is set on the idle crawler.

Should it be desired to disengage both clutches, as for towing the tractor, this can be done by braking one toggle, as in Fig. 6, either top or bottom, blocking the clutch arm in the "out" position, then breaking the other toggle and using the lever to hold that lever out. This is possible due to the free motion of the rods 16 and 17, one in each direction. In case of a jam in the lever connections, it is possible to operate the clutch levers from the pit by a bar attached to their forward extensions.

It will be seen from the foregoing that my invention presents various distinct advantages over known constructions of similar apparatus. For example, it is known to employ clutches on tractors of this general nature for shovel work, and like purposes, on one side only, the other crawler being continuously engaged upon the drive shaft. With such an arrangement it is possible only to go straight or to turn to one side. With my construction, as just explained, it is possible to turn in either direction.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. A mechanism for operating a clutch of the type having a longitudinally movable tooth element, said mechanism including a lever collared to said element, a toggle operatively engaged with said lever, means for moving said toggle in a direction to move said lever to release said clutch, said means permitting motion between said toggle and themselves when said lever moves to engage said clutch, and means constantly tending to move said lever to engage said clutch.

2. A pair of horizontally spaced clutches with common driving means, and means for selectively releasing said clutches, said releasing means consisting of a vertically movable rod centrally disposed and revoluble with respect to said clutches, and a horizontal shaft operable by oscillation in one direction to disengage one clutch without affecting the other and operable by oscillation in the other direction to disengage the second-named clutch without affecting the first-named clutch, said rod being operatively connected to said horizontal shaft to oscillate the same irrespective of the revolved position of the rod.

3. A pair of horizontally spaced clutches with a common driving shaft, and means for selectively releasing said clutches, said releasing means comprising a longitudinally movable rod perpendicular and revoluble with respect to said drive shaft, a shaft parallel to said drive shaft, and a connection for oscillating said shaft by longitudinal motion of said rod, said shaft being operable by oscillation in one direction to disengage one clutch without affecting the other and operable by revolution in the other direction to disengage the second-named clutch without affecting the first-named clutch, said rod being operatively connected to said horizontal shaft to oscillate the same irrespective of the revolved position of the rod.

4. A pair of clutches on a common driving shaft, a lever connected to each clutch, a toggle connected to each lever for moving the same, and means for independently actuating said toggles, said last-named means comprising a shaft parallel to the drive shaft, a standard on said last-named shaft, a one-way connection between said standard and one of said toggles, to move said toggle in one direction only and allowing lost motion when said arm is moved in the other direction, another standard on said shaft, a one-way connection in the opposite direction between said last-named standard and its corresponding toggle.

5. A pair of clutches on a common driving shaft, a lever connected to each clutch, a toggle connected to each lever for moving the same, and means for independently actuating said toggles, said last-named means comprising a shaft parallel to the drive shaft, a standard on said last-named shaft, a rod pivoted to said standard and passing freely through the central joint of one of said toggles, means on said rod for engaging said joint in one direction only, another standard on said shaft, a rod operatively connecting said standard with the central joint of said other toggle, said rod passing freely through said center joint, and means on said arm for moving said center joint with the movement of said rod only in a direction opposite to said first-named direction.

CHARLES H. LOTTE.